(12) United States Patent
Ravindran et al.

(10) Patent No.: US 9,521,076 B2
(45) Date of Patent: Dec. 13, 2016

(54) METHOD AND APPARATUS FOR SCALABLE CONTENT ROUTING AND MOBILITY IN NAMED DATA NETWORKS

(71) Applicant: Futurewei Technologies, Inc., Plano, TX (US)

(72) Inventors: Ravishankar Ravindran, San Ramon, CA (US); Guo-Qiang Wang, Santa Clara, CA (US); Xinwen Zhang, San Ramon, CA (US); Asit Chakraborti, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/988,419

(22) Filed: Jan. 5, 2016

(65) Prior Publication Data

US 2016/0134530 A1    May 12, 2016

Related U.S. Application Data

(63) Continuation of application No. 14/146,540, filed on Jan. 2, 2014, now Pat. No. 9,246,803.

(51) Int. Cl.
| | |
|---|---|
| *H04L 29/08* | (2006.01) |
| *H04L 12/721* | (2013.01) |
| *H04L 12/725* | (2013.01) |
| *H04L 29/12* | (2006.01) |
| *H04W 80/04* | (2009.01) |

(52) U.S. Cl.
CPC ............ *H04L 45/72* (2013.01); *H04L 45/306* (2013.01); *H04L 45/34* (2013.01); *H04L 67/2838* (2013.01); *H04L 67/327* (2013.01); *H04L 61/15* (2013.01); *H04W 80/04* (2013.01)

(58) Field of Classification Search
None
See application file for complete search history.

(56) References Cited

U.S. PATENT DOCUMENTS

| | | | | |
|---|---|---|---|---|
| 9,019,971 | B2* | 4/2015 | Calo | H04L 45/34 370/401 |
| 9,246,803 | B2* | 1/2016 | Ravindran | H04L 45/72 |
| 2012/0136945 | A1* | 5/2012 | Lee | H04L 67/2838 709/206 |
| 2012/0204224 | A1* | 8/2012 | Wang | H04L 67/2819 726/3 |
| 2013/0016695 | A1* | 1/2013 | Ravindran | H04L 67/327 370/331 |

(Continued)

*Primary Examiner* — Brian Roberts
(74) *Attorney, Agent, or Firm* — Futurewei Technologies, Inc.

(57) ABSTRACT

Various disclosed embodiments include methods, systems, and computer-readable media for named data network (NDN) inter/intra-domain mobility. A complete de-coupling of identity and addressing space is established. This provides separation of control and forwarding allowing rich policy based routing, using SDN principles, as well as policy based global resolution. In one embodiment, the de-coupling of identity from location is achieved by a changeable forwarding label field in a header that can have nodal/domain/global scope. This disclosure provides content routing/mobility to be handled with a high degree of flexibility. This disclosure also provides mobility as a service for a component of a name space.

21 Claims, 5 Drawing Sheets

(56) References Cited

U.S. PATENT DOCUMENTS

| | | | |
|---|---|---|---|
| 2013/0039249 A1* | 2/2013 | Ravindran | H04W 4/18 370/312 |
| 2013/0041982 A1* | 2/2013 | Shi | H04L 65/4084 709/217 |
| 2013/0332955 A1* | 12/2013 | Hong | H04N 21/64784 725/34 |
| 2014/0112307 A1* | 4/2014 | Kim | H04W 36/0061 370/331 |
| 2014/0173034 A1* | 6/2014 | Liu | H04L 67/1063 709/217 |

* cited by examiner

METHOD AND APPARATUS FOR SCALABLE CONTENT ROUTING AND MOBILITY IN NAMED DATA NETWORKS

CROSS-REFERENCE TO RELATED APPLICATIONS

The present application is a continuation of U.S. patent application Ser. No. 14/146,540, filed on Jan. 2, 2014, now allowed, which is incorporated herein by reference as if reproduced in its entirety.

TECHNICAL FIELD

The present disclosure relates generally to content routing in Named Data Networks (NDN), and more specifically to NDN Inter/Intra-Domain Mobility.

BACKGROUND

The named data networking (NDN) project aims to develop a new Internet architecture that can capitalize on strengths—and address weaknesses—of the Internet's current host-based, point-to-point communication architecture in order to naturally accommodate emerging patterns of communication. The project studies the technical challenges that must be addressed to validate NDN as a future Internet architecture: routing scalability, fast forwarding, trust models, network security, content protection and privacy, and fundamental communication theory.

The project uses end-to-end test bed deployments, simulation, and theoretical analysis to evaluate the proposed architecture, and is developing specifications and prototype implementations of NDN protocols and applications. NDN Technical Report NDN-0001 Named Data Networking (NDN) Project is a slightly modified version of the NDN project proposal.

Currently, there is no solution from the NDN community to handle mobility, including NDN Inter/Intra-Domain Mobility.

There is desired a solution to handle mobility, including NDN Inter/Intra-Domain Mobility. Objectives include providing scalability, routing on fixed infrastructure elements, routing/forwarding stability, handling seamless mobility of consumers and producers, iterative location resolution, and local caching.

SUMMARY

The present disclosure provides a solution to handle mobility, including NDN inter/intra-domain mobility by complete de-coupling of identity and addressing space. In one aspect of the disclosure, the de-coupling of identity from resolution service point is achieved by providing a changeable forwarding label field in a header that has nodal/domain/global scope. The forwarding-label also allows rich policy based routing, using SDN principles, as well as policy based global resolution. This disclosure provides content routing/mobility, or service dynamism to be handled with a high degree of flexibility. Mobility as a service can be handled by identifying name space that requires mobility service and actively registering them with the network, this is indicated as a service flag in the interest message. Intra-session mobility is achieved by setting a flag in the content response, this indicates all the service routers to re-resolve the mobile name space.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
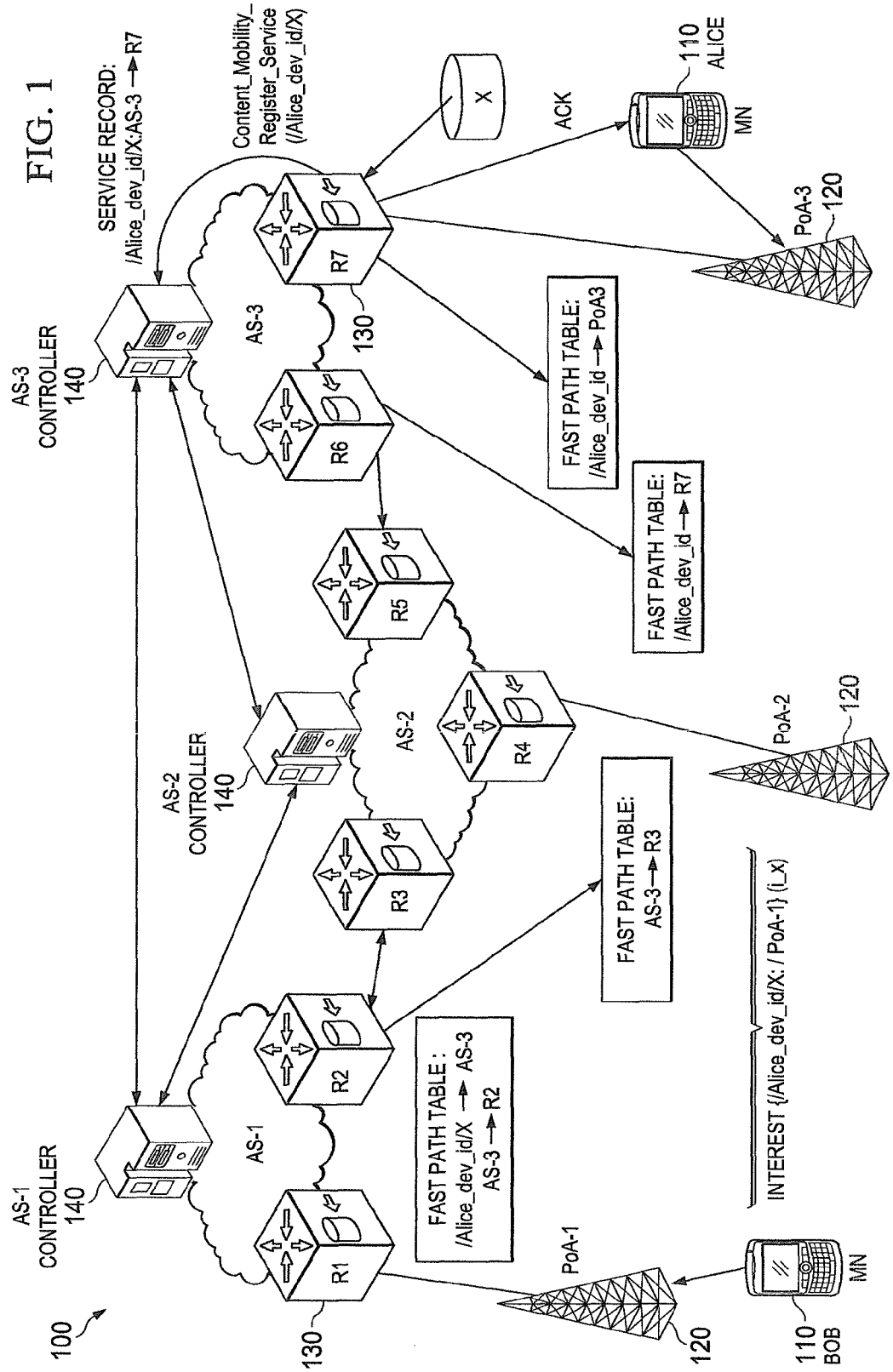
FIG. 1 illustrates a networking system for named-data networking.

This disclosure introduces and/or involves the following network components:

Named Entities: Could be Services/Devices/Content/Users.

Domain Controller: A local domain controller for name resolution and the fast-path table (FPT). The domain controllers also participate in distributed policy based exchange of Entity-id and Network binding. E.g. BGP can be used for this purpose.

Forwarding-Label: To leverage complete decoupling of entity-id and resolution point, the forwarding-label is temporary based on policy requirement, hence, could be of Nodal/Domain/Global scope.

Fast-Path Table: To avoid slow-path resolution, the FPT table allows nodal fast switching, and only the first interest packet of the flow requires resolution. Re-resolution may be required if the resource object is mobile or the service is scaled or migrated.

Entity-ID: The meaning of this remains unchanged from what ICN identifies, and any generic format such as PID can also be used. But this has implication on the content routing implementation as such, this disclosure is unaffected by this.

Mobility Service: Entities register to the network for mobility service, this creates a name:home-network binding. In addition the ICN layer actively marks the content response by setting the mobility flag, which forces re-resolution of the named entities. In addition, the Interest can also have the mobility service flag set for the network to handle the Interest through the FTP and local control resolution.

The present disclosure provides a solution to handle mobility, including NDN inter/intra-domain mobility. This is achieved by complete de-coupling of identity and name resolution space which ICN allows, which is enabled in NDN. This is enabled through a "forwarding-label" in the Interest/Content response. The forwarding-label in the Interest can be set considering rich policy based routing e.g. using SDN principles, as well as policy based global resolution. Optionally, the forwarding-label in the response can be set to allow applications to learn the locator information, which can be set in the subsequent interest requests, or this overhead can be avoided.

In one embodiment, the de-coupling of name from location is achieved by introducing a forwarding-label field in the NDN header that can have nodal/domain/global scope. The forwarding-label field could have nodal/segment scope as resolution may happen at every hop, or end of a segment, giving fine grained routing/forwarding. The scope of the forwarding-label field is a result of resolution happening at each domain, particularly at the entry and exit points through service routers. Multiple domains can agree on global scope forwarding label, and this is similar to an IP locator or MPLS label that determines an end-to-end or path segments. This allows content routing/mobility to be handled with high degree of flexibility. In a general case the forwarding-label could also encode explicit paths or sub-paths as concatenation of named network/router elements; at the egress points of these sub-paths the resolution can iterate to enforce more routing policies.

FIG. 1 illustrates a NDN network at 100 that supports seamless mobility according to the present disclosure. The system 100 may comprise a plurality of mobile nodes (MN) 110, a plurality of point of attachments (PoA) 120 providing network access to the mobile nodes 110, a plurality of content routers (R) 130, and a plurality of interconnected domain controllers (AS) 140. In network 100, each entity (e.g. content portion, chunk, mobile entity, or networking element) may be uniquely identified by an identifier.

Figure 2:
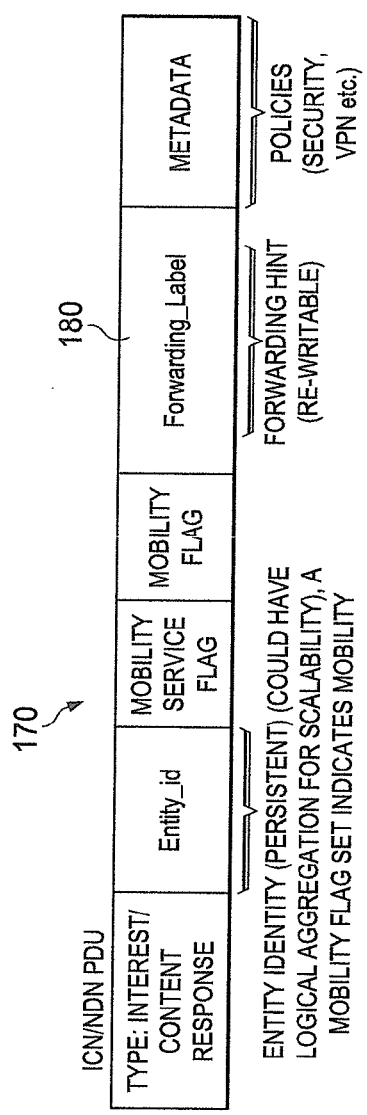
FIG. 2 illustrates a forwarding-label field introduced into a header facilitating inter/intra-domain mobility according to one embodiment of the disclosure.

This disclosure achieves NDN inter/intra domain mobility whereby each NDN header 170 is provided with forwarding locator field 180, also referred to as a forwarding-label herein, as shown in FIG. 2. Each NDN header 170 is assumed to have a distinct ID. Advantageously, this forwarding locator field 180 enables policy at every hop and domain in network 100.

The local resolution for a remote content-ID is at the level of the AS 140, through the associated resolution controller. There is a resolution service controller per AS 140. In one solution, the resolution service controller of each AS 140 syncs with each other either through a distributed protocol (BGP) or rooted at a global controller, enable inter-AS connectivity; or else when device/user/service registers it binds its name with a home-domain which is consulted for name resolution, in this case no synchronization is required. The domain service controller is a logical overlay across multiple domains and may or may not be topology aware (intra- and inter-domain), and manages service directory binding depending on the solution.

In the case where a global synchronization is assumed, the entries are as follows:

local/remote_name_object_id→ network address/locator

If network binding is part of the name the entries are only local, but the name itself identifies the home controller service, in this case the entries are only for local entities:

Local_name_object_id→ network address/locator

This resolution can also be determined dynamically through flooding over the logical overlay of resolution servers, or through structure routing between resolution servers, such as a tree with root resolving all the resource object ids, or by binding the resolution controller service with the entity ID; here, it is assumed the global reachability of the resolution controller.

If the resolution controller is topology aware, then this mapping may exist, else it is assumed that the forwarding network has information on how to route the Interest packet based on the forwarding label.

For local content:
local_content_id→ local_Router_ID; and

For remote content:
Remote_content_id→ Network-ID
Network-ID→ Traffic engineering policy (e.g. Border_router_ID)

Else, if the topology routing is distributed, the router themselves should be able to handle forwarding based on routing information populated through a distributed control plane.

Advantageously, only the first interest will go through the slow path, once resolved a fast path table (FPT) entry is created. The FPT entry is assumed to be managed actively using soft states. For efficiency, the FPT may only be managed at the edge service routers, i.e. at the entry points of the network facing the use traffic. The remaining routers can do name based forwarding but based on topological IDs instead of content IDs.

In the remote domain, the fast path table (FPT) carries local content flow entries, and this can be populated as a result of local content resolution. Remote content entries are done on demand.

The FPT holds two forwarding data structures, one is for short term flows to support content/service/host level resolution, and the other is long term flows to support network/router level resolution, the latter can also be merged with the FIB in case of NDN. The need of the second data structure depends on if the core routers have the capability of routing on remote network/router ID's or not. If the domain routing is local, then the forwarding-label is only set to local domain routing context.

The forwarding-label can be swapped at the intermediate destination point (based on the scope defined earlier), after resolution or through FPT look-up. The FPT is updated with new flow entries after every resolution.

The producer's seamless mobility itself can be handled in at least two possible ways. First, when a producer moves it can notify of any such movement by marking the content object with a mobility flag bit. When service routers receive content with the mobility bit set, it can try re-resolving the resource object. At this point the resolution infrastructure can re-resolve the resource-object-id and apply new path policies, for e.g. if the producer moves from one domain to another, then completely new routing policies may have to be applied.

The domain controller (AS) 140 acts as a slow path for resolution, when a packet enters a domain controller (AS) 140 without a forwarding label or in-direction point is reached. For example, referring to FIG. 1, as long as Alice_dev_id moves around PoAs 120 associated with the service router R7, only local updates are required.

Whenever the entity is mobile, the content response contains the mobility flag which will be set, it will be unset otherwise. This enables the service nodes to re-resolve the entity ID.

If the service router R for Alice_dev_id changes, then domain level update is required. With home domain binding to entity ID, the foreign controller can update the home controller about the location of the entity, without having the controllers to synchronize any information.

The inter-domain update is required if Alice_dev_id moves out of the domain.

This solution holds good both for static and mobile content.

Caching/Publishing

The role of BGP or similar protocols like MH-DHT is purely for content resolution, unlike its role in BGP to manage the FIB. This mitigates BGP stability issue from the forwarding plane.

Dynamic content arriving into the network 100 can be locally cached for multicasting, using the content name against the content store.

Explicitly published content at the AS 140 can be resolved to access the router R holding the content.

State based reverse path forwarding, or explicit resolution of source-id, can be used to set a bi-direction entry in the FPT.

The domain based approach allows local policy imposition both for local and remote content as well, than centralized GNRS approach which lacks that ability.

Illustrative Example

Figure 3:
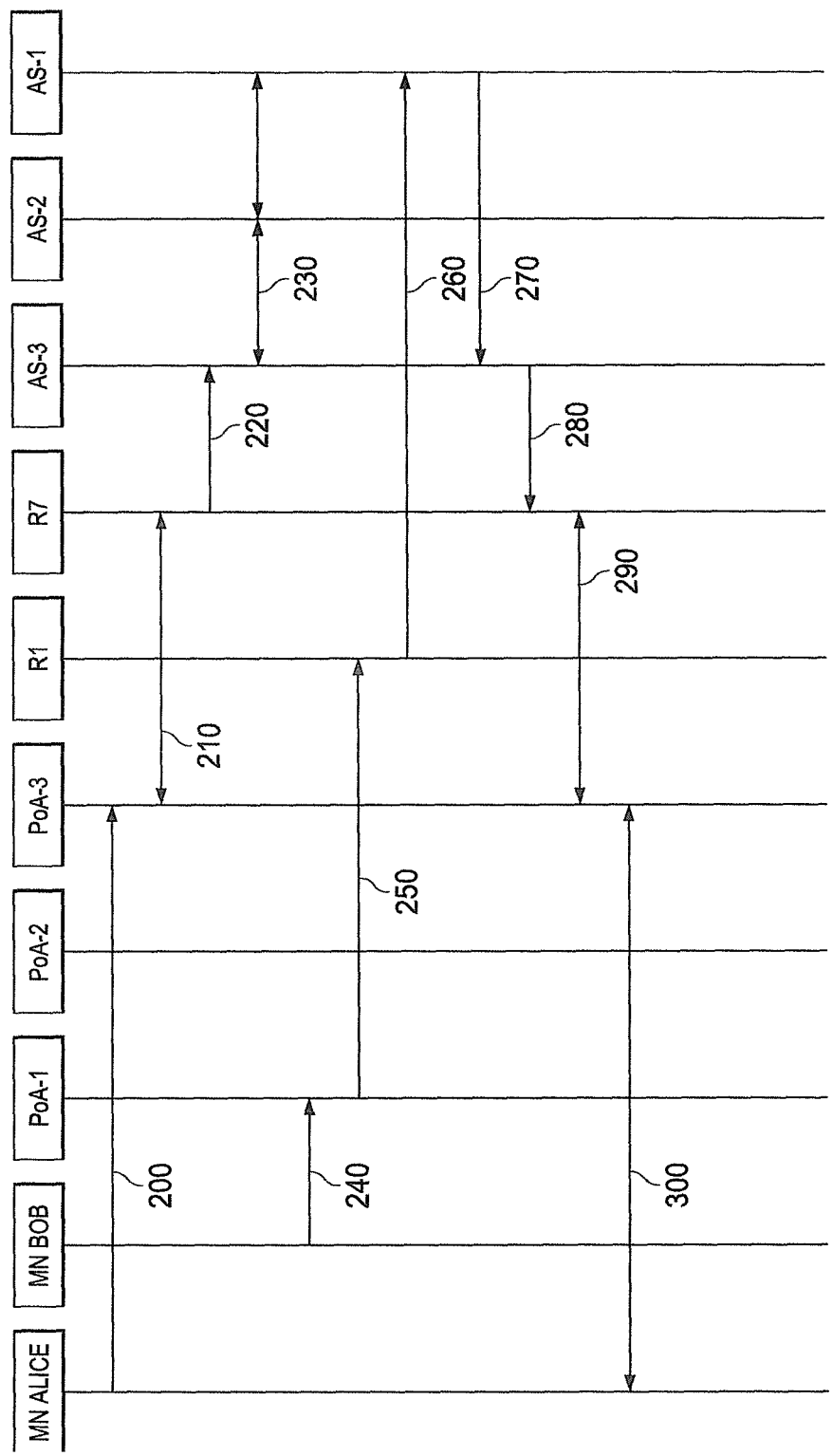
FIG. 3 illustrates a seamless mobility method according to one embodiment of the disclosure.

Referring to FIG. 3 in view of FIG. 1, the following example illustrates advantageous aspects of the present disclosure.

MN 100 labeled Alice is the producer and MN 100 labeled Bob is the consumer.

At step 200, Alice's device (Alice_dev_id) holds content X. Alice requests network 100 for service mobility of this content. Alice registers /Alice_dev_id/X to its serving PoA 120, here, PoA-3 (assume a proxy agent (PA) in each POA). The network binds a home network id to the name, to support mobility. /Alice_dev_id/X: AS-3/RS. RS Stands for resolution service (i.e. the controller resolution service)

At step 210, PoA-3 forwards the registration to its service router 130, router R7. The service router R7 creates a local entry in its FPT:

/Alice_dev_id/X: AS-3/PoA3

Then, router R7 acknowledges PoA-3, which PoA-3 also creates a local entry in its FPT:

/Alice_dev_id/X: AS-3→/Alice_dev_id.

At step 220, the service router R7 then registers the name /Alice_dev_id/:AS-3 (aggregated for scalability) to its domain controller 140, AS-3, which creates mapping in its service routing table:

/Alice_dev_id/:AS-3→ AS-3

The network association with name could be based on any logical ID, but it has to map to an AS level routable network name, and it is assumed the two are same here.

The controllers resolve these bindings with other controllers on-demand.

If the controllers are topology aware, they map further from AS_ID→Border-locator based on certain routing policies.

Router R7 assumes a logical separation between container and the content.

The domain controllers 140 sync these bindings with other domain controllers 140. The controllers 140 are topology aware, hence, they can map further from AS_ID→Border-locator.

At step 240, Bob expresses interest for Alice content Alice_dev_id/X:AS-3/RS.

Bob's MN is configured with a default '/' prefix in its FIB for next hop as /PoA-1 (could further resolve to another locator ID). This is set as its forwarding-label.

The interest is then forwarded to the PoA 120 servicing Bob's MN, PoA-1. PoA-1 for its uplink can avoid any resolution and forward it directly to serving router R1.

At step 250, at router R1, if the flow entry for /Alice_dev_id/X:AS-3/RS is not there, then at step 260 the router R1 resolves through the serving domain controller, AS-1.

At step 270, the domain controller AS-1 returns the /Alice_dev_id/:AS3 mapping to AS-3, and AS-3 mapping to multiple router-IDs, only if the controller is topology aware.

It is assumed the router-IDs reachability through FIB, as these entries are persistent, and long lived. The interest at router R1 can be multicasted based on the controller AS-3 response. The forwarding-label is now swapped for the border node labels and multicasted into the network 100. These steps iterate at each domain, until the edge routers R of AS-3 are reached.

At step 280, at the AS-3 edge routers, the local domain resolution should result in locating the service router R7 serving Alice's MN.

The forwarding-label is set to router R7, when R7 receives it, and has a FPT entry for PoA-3 which has the entry for /Alice_dev_id/X, similar forwarding happens at /PoA-3. Content Alice_dev_id/X at the Alice MN is then made available at steps 290 and 300.

When Alice_dev_id moves within her home domain, the current attachment point (Router) updates the local controller about her location. So any new session can resolved to the new location.

When Alice_dev_id moves outside her home domain, when Alice registers, the foreign domain can identify Alice's home domain (with its network binding) in its name update the home controller.

Figure 4:
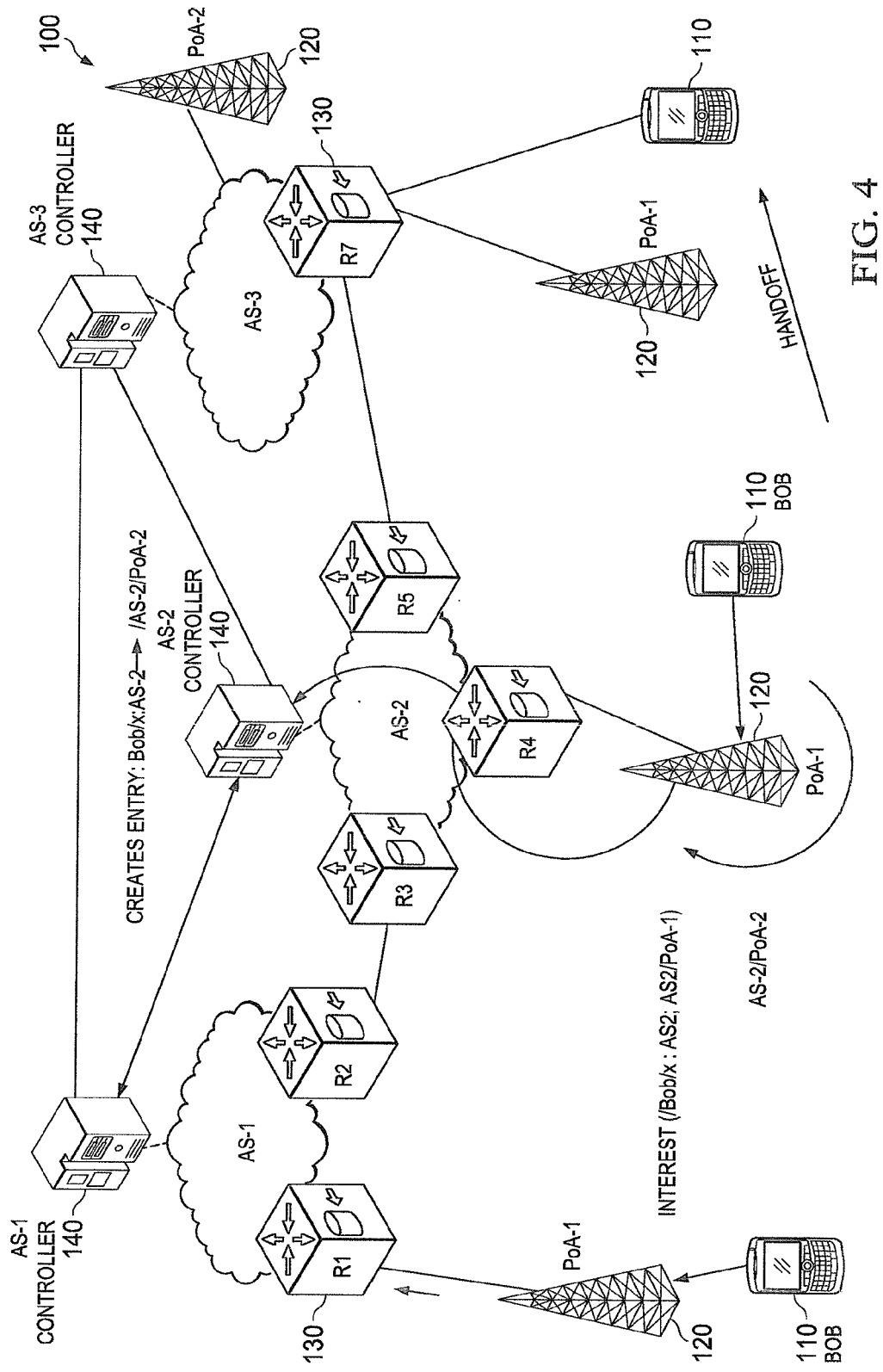
FIG. 4 illustrates the networking system handling seamless mobility.

Referring now to FIG. 4, there is shown network 100 handling seamless mobility. When Bob is mobile and moves to another PoA, shown as PoA-1, the application (after getting notified) or the ICN layer marks the content response with the mobility flag as shown in FIG. 2.

As mobility as a service, ICN layer marking is more appropriate, as the set of content flows which require this support.

The edge routers which receive this content response with this mobility flag re-resolve FPT entries to its new location.

FIG. 4 depicts Bob/x registering with network 100 through PoA-1, edge router R4 of AS-2 domain controller 140. AS-2 domain controller 140 creates entry:Bob/x:AS-2→AS-2/PoA-2. The edge node R1 which receives content objects with the mobility flag set resolves through the domain controller AS-1 supporting Alice holding interest /Bob/x:AS2;AS2/PoA-1. Just before Bob handoffs to PoA-2, Bob begins to respond to the content response by setting the mobility flag.

Mobility as a Service

Mobility is requested from the network only when required as it incurs cost (forwarding/control over head etc.). Mobility includes Active Registration/De-registration, and could be enabled at Content, Device, or Service Level.

Mobility Service as Part of the Entity ID:

A mobility_service_flag is included as part of the name. This includes marking the component that is mobile, for e.g., /ravi_device/content/x..:M_FLAG:N (means only the 1-N component of the name is mobile). This allows the network to handle these interests in a special way.

Decentralized Name Resolution:

Every Organization manages the name space. The Organization-ID is binded to the name, during mobility service request(I:D). D is the service resolution point. /ravi_device/pics/x..:M_FLAG:2: att/nrs Foreign name resolvers update home domain to update locations. No synchronization between Name Resolution Service instances, only notification.

In-path Re-resolution:

The forwarding-label is modified in-path via name resolution service. The Content response can have the mobility-flag set, and this results in all the service routers to re-resolve the mobile Entity.

Mobility Over a Name Space

Figure 5:
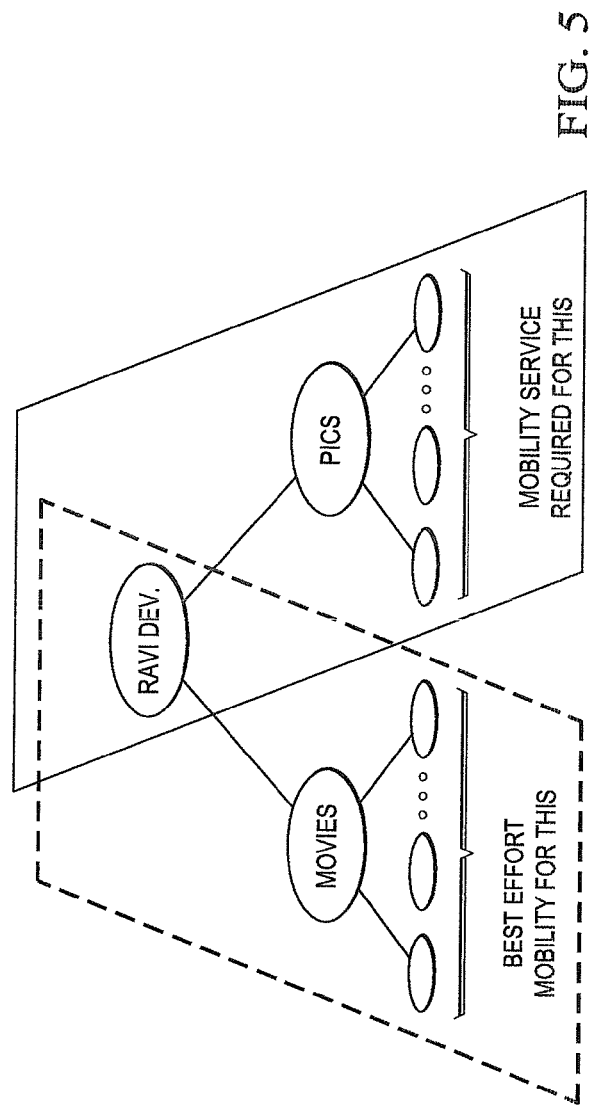
FIG. 5 illustrates mobility over a name space.

Referring to FIG. 5, this illustrates Mobility over a Name Space. The user actively registers the name space for which he requires mobility. Then, the Mobility Infrastructure ensures fast name resolution service to handle both intra/inter session cases.

The network knows the Mobility Prefix as follows:

During registration or publishing the desired mobile entity, the network adds its own mobility service tags. So in case of /ravi_device/pics/..:M_FLAG:2, it says the service routers any flows for /ravi_device/pics prefix has to be monitored for mobility.

The Name Resolution Server Synchronization is avoided by binding the Name Prefix for e.g. /ravi_device with a Home Domain Name Resolution service, hence /ravi_device/pics/x..:M_FLAG:1:att/nrs, here att/nrs resolves /ravi_device/pics. This is for new flows from consumers at the Service Routers.

Intra-session mobility is handled by considering there is more than one consumer in multiple domains.

The mobility flag is introduced in the content response, as shown in FIG. 2, as the content response traverses all the Service Routers, they can quickly update their FPT, as they have information of the home domain.

Figure 6:
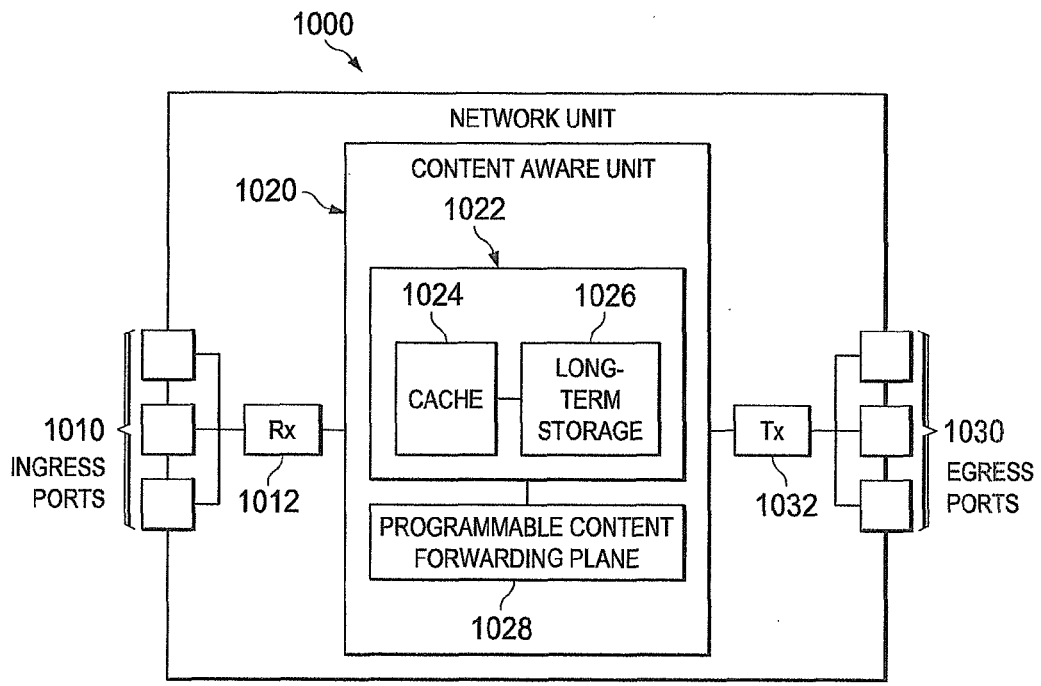
FIG. 6 illustrates a diagram of a network unit which may be any device that transports and processes data through the network.

FIG. 6 illustrates an embodiment of a network unit 1000, which may be any device that transports and processes data through network 100. For instance, the network unit 1000 may correspond to or may be located in any of the system nodes described above, such as a MN, PoA, content router R, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 6.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 7:
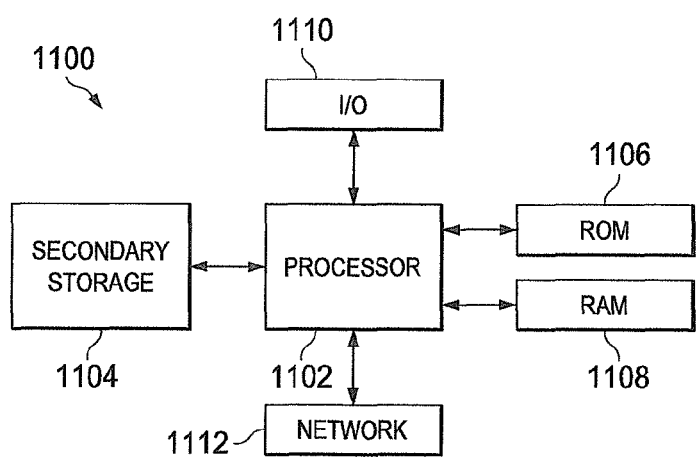
FIG. 7 a diagram of network components.

The network components described above may be implemented on any general-purpose network component, such as a computer or network component with sufficient processing power, memory resources, and network throughput capability to handle the necessary workload placed upon it. FIG. 7 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system configured for routing a message in a named data network (NDN), comprising:
a first service router configured to receive a registration message from a producer node and send the registration message to a domain controller for registering the producer node, wherein the producer node provides content; and a second service router configured to:
receive an interest message from a consumer node, wherein the interest message indicates interest for the content, and a header of the interest message includes a name of the content, obtain a first forwarding label according to the name of the content, wherein the first forwarding label indicates an address associated with a location of the content; and send an updated interest message to a next hop node in the NDN network, wherein a header of the updated interest message includes a first field containing the name of the content and a second field containing the first forwarding label, and wherein the first field and the second field are two separate fields.

2. The system of claim 1, wherein the first forwarding label has a nodal, a domain, or a global scope.

3. The system of claim 1, wherein the system further comprises an intermediate destination point configured to swap the first forwarding label to a second forwarding label after resolution or through a fast pass table (FPT) look-up.

4. The system of claim 1, wherein the domain controller further configured to create a local entry, wherein the local entry includes a correspondence between the name of the content and the first forwarding label.

5. The system of claim 4, wherein the system comprises a multiple of domains, each domain has a domain controller, and wherein the domain controller of the producer node is configured to synchronize the correspondence between the name of the content and the first forwarding label with other domain controllers.

6. The system of claim 4, wherein the name of the content having a plurality of components, wherein a first component of the plurality of components is configured for mobility service.

7. The system of claim 6, wherein the first component is configured for mobility and identification as part of a published name.

8. The system of claim 6, wherein the name of the content comprises a mobility service flag indicative of use to a mobility resolution infrastructure.

9. The system of claim 8, wherein the mobility service flag is indicative of first component that is mobile.

10. A method performed by a service router in a named data network (NDN) to route messages, comprising:
receiving an interest message from a consumer node, wherein the interest message is used to express interest for content, and a header of the interest message includes a name of the content;
Obtaining a forwarding label according to the name of the content, wherein the forwarding label indicates an address associated with a location of the content; and
Sending an updated interest message to a next hop node in the NDN network, wherein a header of the updated interest message includes a first field containing the name of the content and a second field containing the forwarding label, and wherein the first field and the second field are two separate fields.

11. The method of claim 10, wherein before obtaining the forwarding label, the method further comprises:
retrieving the forwarding label from a fast path table stored at the service router.

12. The method of claim 10, wherein before obtaining the forwarding label, the method further comprises:
sending, by the service router, a request for the forwarding label to a domain controller.

13. The method of claim 12, wherein after obtaining the forwarding label, the method further comprises:
creating, by the service router, a local entry in a fast path table stored at the service router, wherein the local entry includes a correspondence between the name of the content and the forwarding label.

14. The method of claim 12, wherein the method further comprises:
updating, by the domain controller, a correspondence between the name of the content and the forwarding label in responsive to a mobility service flag indicating a mobility of the content's producer node.

15. The method of claim 10, wherein the forwarding label has a nodal, a domain, or a global scope.

16. A service router for routing a message in a named data network (NDN), comprising:
a processor; and
a memory coupled to the processor and storing programming for execution by the processor;
the processor configured to execute the programming to perform operations of:
receiving an interest message from a consumer node, wherein the interest message is used to express interest for content, and a header of the interest message includes a name of the content;
obtaining a forwarding label according to the name of the content, wherein the forwarding label indicates an address associated with a location of the content; and
sending an updated interest message to a next hop node, wherein a header of the updated interest message includes a first field containing the name of the content and a second field containing the forwarding label, and wherein the first field and the second field are two separate fields.

17. The service router of claim 16, wherein the processor is configured to execute the programming to perform an operation of:
retrieving the forwarding label from a fast path table stored at the service router.

18. The service router of claim 16, wherein the processor is configured to execute the programming to perform an operation of:
sending a request for the forwarding label to a domain controller.

19. The service router of claim 18, wherein the processor is configured to execute the programming to perform an operation of:
creating a local entry in a fast path table stored at the service router, wherein the local entry includes a correspondence between the name of the content and the forwarding label.

20. The service router of claim 16, wherein the processor is configured to execute the programming to perform an operation of:
updating a correspondence between the name of the content and the forwarding label in responsive to a mobility service flag indicating a mobility of the content's producer node.

21. The service router of claim 16, wherein the forwarding label has a nodal, a domain, or a global scope.

* * * * *